(12) United States Patent
Hahn et al.

(10) Patent No.: US 6,233,868 B1
(45) Date of Patent: May 22, 2001

(54) PLANT GUARD APPARATUS

(76) Inventors: Gerhard Hahn; Rhonaldia Hahn, both of 1003 Barksdale Rd., Newark, DE (US) 19711

( * ) Notice: Subject to any disclaimer, the term of this patent is extended or adjusted under 35 U.S.C. 154(b) by 0 days.

(21) Appl. No.: 09/373,839

(22) Filed: Aug. 13, 1999

(51) Int. Cl.[7] ................................................. A01G 13/00
(52) U.S. Cl. ................................................................ 47/30
(58) Field of Search ............................. 47/21, 26, 28.1, 47/30

(56) References Cited

U.S. PATENT DOCUMENTS

| | | | |
|---|---|---|---|
| 3,214,865 | 11/1965 | Rosenvold et al. | 47/29 |
| 3,226,881 | * 1/1966 | Garrett | 47/30 |
| 3,384,992 | 5/1968 | Heffron | 47/29 |
| 4,711,051 | * 12/1987 | Fujimoto | 47/30 |
| 4,829,707 | 5/1989 | Koffler et al. | 47/28 R |
| 4,903,431 | 2/1990 | Stoll | 47/28.1 |
| 5,179,798 | 1/1993 | Sonagere | 47/29 |
| 5,394,645 | * 3/1995 | Wilson | 47/30 |
| 5,398,443 | * 3/1995 | Johnson et al. | 47/21 |

\* cited by examiner

*Primary Examiner*—Charles T. Jordan
*Assistant Examiner*—Francis T. Palo
(74) *Attorney, Agent, or Firm*—Henderson & Sturm LLP

(57) ABSTRACT

A plant guard apparatus (10) for protecting the emerging growth and root system of a plant (100). The apparatus (10) includes a generally frustro-conical shaped housing member (20) having an enlarged bottom opening (21), a reduced diameter to opening (22), angled side walls (23) and a plurality of apertured tabs (24) projecting outwardly from the bottom periphery of the housing member (20) and adapted to receive alike plurality of anchor stake members (40) which are alignable with the angled side walls (23) of the housing member (20) such that the stake members (40) can be selectively angled away from the root system of the plants (100).

5 Claims, 1 Drawing Sheet

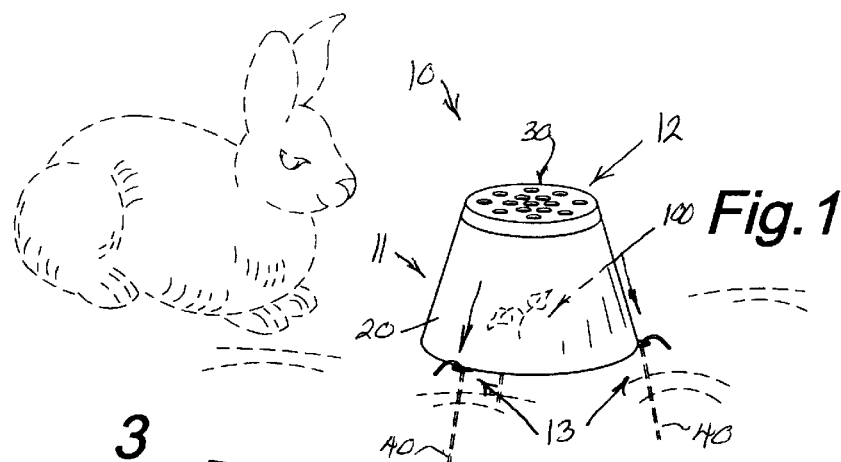
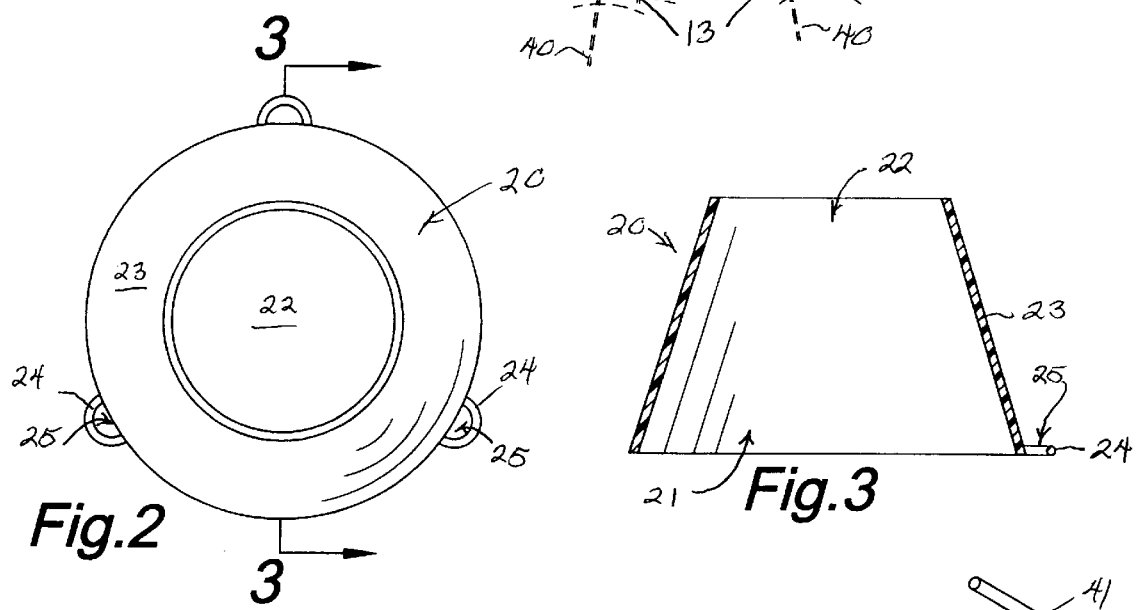
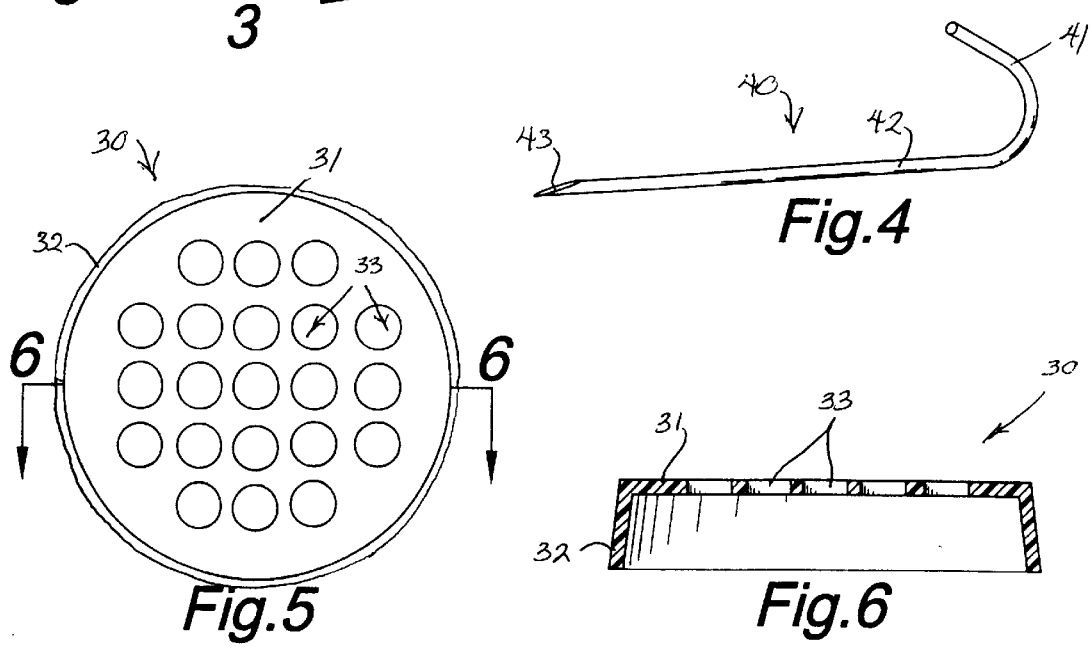

PLANT GUARD APPARATUS

BACKGROUND OF THE INVENTION

1. Field of the Invention

The present invention relates to the field of protective shields for growing plants in general, and in particular to a slope walled plant guard apparatus that allows the anchors of the plant guard to be angled away from the plant's root system.

2. Description of Related Art

As can be seen by reference to the following U.S. Pat. Nos. 3,214,865; 3,384,992; 4,903,431; 4,829,707; and 5,179,798, the prior art is replete with myriad and diverse constructions designed to protect plants from varmints or the like.

While all of the aforementioned prior art constructions are more than adequate for the basic purpose and function for which they have been specifically designed, they are uniformly deficient with respect to their failure to provide a simple, efficient, and practical way to protect both the roots and above ground portions of a growing plant by use of an angled housing that will accept outwardly angled housing anchors.

While most of the above cited patents share many of the structural features found in the present invention, they do not have any provision for the selective placement of the plant protector anchors at a pronounced angle away from the plant root system.

As a consequence of the foregoing situation, there has existed a longstanding need for a new and improved plant guard apparatus that will allow not only the above ground portion of the plant to be protected, but will also insure that the protector anchor members are sharply angled away from the plant root system, and the provision of such an apparatus is a stated objective of the present invention.

BRIEF SUMMARY OF THE INVENTION

Briefly stated, the plant guard apparatus that forms the basis of the present invention comprises in general, a housing unit, a cap unit and an anchor unit.

As will be explained in greater detail further on in the specification, the housing unit comprises a generally frustro-conical shaped housing member having an enlarged lower opening and a reduced diameter lower opening wherein the lower end of the housing member is provided with a plurality of outwardly projecting apertured tabs that are designed to accommodate the anchor unit in a unique fashion.

In addition, the anchor unit includes a plurality of anchor members each having an elongated shaft and a curved head. The elongated shafts are designed to be aligned with the tapered walls of the housing member such that a downwardly directed force applied to the curved head of the anchor member will cause shafts of the anchor members to penetrate the ground at an acute angle directed away from the root system of the plant.

Furthermore, the cap unit includes an apertured cover member dimensioned to fit over the top of the housing member to provide a measure of overhead cover for the plants during their initial growth stages.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the plant guard device in use;

FIG. 2 is an isolated top plan view of the housing unit;

FIG. 3 is a cross sectional view of the housing unit taken through line 3—3 of FIG. 2;

FIG. 4 is an isolated perspective view of one of the anchor members;

FIG. 5 is a top plan view of the cap unit; and

FIG. 6 is a cross sectional view of the cap unit taken through line 6—6 of FIG. 5.

DETAILED DESCRIPTION OF THE INVENTION

As can be seen by reference to the drawings, and in particular to FIG. 1, the plant guard device that forms the basis of the present invention is designated generally by the reference number 10. The device 10 comprises in general a housing unit 11, a cap unit 12, and an anchor unit 13. These units will now be described in seriatim fashion.

As shown in FIGS. 1 through 3, the housing unit 11 comprises a generally rigid frustro-conical housing member 20 having an enlarged bottom opening 21, a reduced diameter top opening 22, and angled side walls 23. The bottom periphery of the housing member 20 is provided with a plurality of outwardly projecting tabs 24 provided with apertures 25 dimensioned to receive a portion of the anchor unit 13, as will be explained further on in the specification.

Turning now to FIGS. 1, 5, and 6, it can be seen that the cap unit 12 comprises a cover member 30 having a generally flat upper surface 31 provided with a downwardly depending outwardly flared skirt 32 dimensioned to conform to the tapered upper end of the housing member 20. The upper surface 31 of the cover member 30 is provided with a plurality of apertures 33 that are designed to admit fresh air and rain into the interior of the housing member 20 while preventing a hard downpour from flattening young seedlings during their initial growth period.

As can best be seen by reference to FIGS. 1 and 4, the anchor unit 13 comprises a plurality of anchor stake members 40 wherein each anchor stake member 40 is provided with an outwardly extending curved head 41 which is formed integrally with an elongated shaft 42 having a ground penetrating point 43 formed on its lower end.

As can best be appreciated by reference to FIG. 1, the plant guard apparatus 10 is initially positioned over young seedlings 100 when they are first planted or begin to emerge form the ground to prevent varmints such as rabbits or the like from consuming the tender shoots.

The housing member 20 is placed over the seedling 100 such that the seedling is centrally disposed within the housing and then the individual anchor stake members 40 are aligned with the tab openings 25 and the angled walls 23 of the housing member 20 such that when a downward force is applied to the curved head 41 of the stake members 40 the pointed end 43 of the shaft 42 will penetrate the ground at an acute angle directed away from the root system of the plant seedling.

It should further be noted that the angled walls 23 of the housing member also permit the anchor stake members 40 to be deployed in a non-radial fashion relative to angled side wall 23 of the housing member 20 particularly in those instances when several housing members 20 are aligned in close proximity to one another. The potential exists for the anchor stake member 40 on one housing member 20 to penetrate the ground in such a manner as to interfere with the root system of an adjacent covered plant seedling.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A plant guard apparatus to protect growing plants and their root systems wherein the apparatus comprises:
    a housing unit including a generally frustro-conical shaped housing member having an enlarged bottom opening, a reduced diameter top opening and angled side walls wherein the housing member has a lower end provided with a plurality of outwardly projecting apertured tabs; and
    an anchor unit including a plurality of anchor stake members wherein each stake member has an outwardly projecting head associated with an elongated shaft having a pointed end, wherein the anchor stake members are adapted to be aligned and engaged with the angled side walls of the housing member along their entire length of the elongated shaft so that the stake members can be angled away from the root system of the plant.

2. The apparatus as in claim 1 further comprising:
    a cap unit including a cover member having a generally flat upper surface provided with a downwardly depending flared skirt.

3. The apparatus as in claim 2 wherein the upper surface of the cover member is provided with a plurality of apertures.

4. The apparatus as in claim 3 wherein the cover member is releasably associated with the top opening of the housing member.

5. A method of protecting growing plants and their root systems by employing a generally frustro-conical shaped housing member having an enlarged bottom opening, angled side walls and a lower end provided with a plurality of outwardly projecting apertured tabs in combination with a plurality of stake members having elongated shafts including the steps of:
    a) placing the enlarged bottom opening of the housing member over the top of the growing plant
    b) lowering the housing member so that the lower end of the housing member rests on the ground
    c) sequentially aligning the plurality of stake members with angled sidewalls and the plurality of outwardly projecting apertured tabs; and,
    d) maintaining the elongated shafts of the stake members in contact with said angled sidewalls as the stake members are forced into penetrating engagement with the ground so that the stake members are angled away from the root system of the plant.

* * * * *